(12) United States Patent
    Mix

(10) Patent No.: US 10,420,348 B1
(45) Date of Patent: Sep. 24, 2019

(54) APPLIANCE FOR CONTROLLED RISING OF DOUGH

(71) Applicant: Beverly J. Mix, Murdo, SD (US)

(72) Inventor: Beverly J. Mix, Murdo, SD (US)

( * ) Notice: Subject to any disclaimer, the term of this patent is extended or adjusted under 35 U.S.C. 154(b) by 0 days.

(21) Appl. No.: 16/193,386

(22) Filed: Nov. 16, 2018

(51) Int. Cl.
    *A21C 13/00* (2006.01)

(52) U.S. Cl.
    CPC ..................................... *A21C 13/00* (2013.01)

(58) Field of Classification Search
    CPC ...... A21C 13/00; A21D 15/00; A47J 36/2494; A47J 37/0713; A47J 37/0763
    USPC ......... 99/468, 483, 451, 473, 516, 536, 467, 99/474, 475, 476, 477, 479; 426/27, 232, 426/233, 505; 219/385, 386, 394, 400, 219/401
    See application file for complete search history.

(56) References Cited

U.S. PATENT DOCUMENTS

| | | | |
|---|---|---|---|
| 4,483,243 A | 11/1984 | Cote | |
| 4,960,211 A | 10/1990 | Bailey | |
| 5,463,940 A | 11/1995 | Cataldo | |
| 6,465,762 B1 | 10/2002 | Swayne et al. | |
| 6,564,699 B1 | 5/2003 | Vincente et al. | |
| 6,870,136 B1 | 5/2005 | Majordy | |
| 6,894,252 B2 | 5/2005 | Paller et al. | |
| 7,975,604 B2 | 7/2011 | Boryca | |
| 8,516,953 B2 | 8/2013 | Fiori | |
| 8,939,069 B2 | 1/2015 | Taylor | |
| 2010/0175566 A1* | 7/2010 | Bois | A21D 15/00 99/473 |

* cited by examiner

*Primary Examiner* — Phuong T Nguyen
(74) *Attorney, Agent, or Firm* — Cramer Patent & Design, PLLC; Aaron R. Cramer (57) ABSTRACT

An appliance for the controlled rising of dough includes a cuboid-shaped housing having a control knob in electrical communication with a power source and a thermostatically controlled heating element secured within a removable bladder. A drawer is provided beneath a dough chamber configured for the storage of flour-coated towels. The legs of the device have the appearance of teacups. The device provides a convenient method of permitting dough to rise in a controlled environment.

20 Claims, 7 Drawing Sheets

APPLIANCE FOR CONTROLLED RISING OF DOUGH

FIELD OF THE INVENTION

The present invention relates to an appliance for controlled rising of dough.

BACKGROUND OF THE INVENTION

Just about everyone loves the taste of baked goods. Whether it is a cookie, a pie, or a favorite pastry, they are enjoyed all over the world at just about all times of the day. One aspect of baked goods which greatly define their quality is the proper and consistent rising of the baking dough. Should the process be interrupted, uneven, or performed at an improper temperature, the quality of the finished baked goods will suffer as well. The problem remains the same with fresh dough or dough that has been frozen prior to raising.

Accordingly, there exists a need for a means by which baking dough can be raised in a controlled temperature environment in an effort to ensure the utmost quality of the finished baked goods. The development of the dough rising appliance 10 fulfills this need.

SUMMARY OF THE INVENTION

The inventor has recognized the aforementioned inherent problems and lack in the art and observed that there is a need for a dough rising appliance having an outer enclosure, an upper tray holding a removable bladder. The removable bladder sits in the upper tray and is removable. The removable bladder may also be filled with a liquid through a fill port complete with a tethered watertight snap cap. The removable bladder is bounded on a bottom by a first heat transferring barrier which permits heat emanating from a heating coil to be transferred upward into the removable bladder.

The dough rising appliance also comprises a lower drawer section containing a slide-out drawer which has handle. The slide-out drawer is supported by a pair of drawer slides that are attached to the bottom of the outer enclosure. The dough rising appliance also comprises a power switch which is controlled by a thermostatic control which is capable of activating the dough rising appliance, a power indication light indicating application of AC power to a heating coil indicated by a heating indication light, an over temperature limit switch to automatically shutoff power the heating coil should an over-temperature situation develop and a plurality of support feet supporting the dough rising appliance. The heating coil and the heating indication light operate in a parallel simultaneous manner to inform the user via the heating indication light whenever the heating coil is active.

The dough rising appliance may also comprise at least one baking pan placed atop the removable bladder during use. The heat from the heating coil are evened and tempered by the removable bladder and is emitted upward as radiant heat. The radiant heat passes through at least one baking pan to cause a plurality of dough to rise with even, constant, and moist radiant heat which is designed to result in an environment for the dough to rise.

A ground connection to the outer enclosure may be provided while a ground fault current interrupting receptacle which is connected to the dough rising appliance may also be provided. The removable bladder may be generally rectangular in shape and is provided with a plurality of softened edges to facilitate internal strength.

The internal liquid of the removable bladder is capable of being removed to reduce weight and overall storage requirements in between uses of the dough rising appliance. The heating coil is radially wound around a coil support system that is both electrically insulated and thermally resistant to high temperatures and may comprise of mica.

The dough rising appliance may also comprise a lid with a planar body with a lid skirt. The lid may have an area sized to fully cover the water bladder of the upper tray when placed thereon and the lid skirt stops short of covering the power switch, the thermostatic control, the power indication light, and the heat indication light. A centrally located handle upon an upper surface may also be provided. The lower drawer section may be used for general storage, warming towels, keeping food warm prior to serving, and rewarming foods to enhance apparent freshness. The heating coil and the heating indication light may operate in a parallel simultaneous manner to inform the user via the heating indication light whenever the heating coil is active.

The dough rising appliance may also comprise an opposite pole of the heating coil and the heating indication light are connected to the neutral leg thus completing a circuit. A portion of heat from the heating coil may be directed downward through a second heat transferring barrier and into the slide-out drawer, when provided as part of the lower drawer section. The removable bladder may be removable, washable, and replaced if needed. A hot leg may be routed through a power switch and energize the power indication light through a return electrical path via a neutral leg. The switched power from the power switch may be routed through the thermostatic control which allows for temperature adjustment by the user. The dough rising appliance may be powered by AC current through a power cord.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY 10 dough rising appliance
15 outer enclosure 20 upper tray
22 lid
23 lid skirt
24 lid handle
25 optional lower drawer section
30 removable bladder
35 slide-out drawer
40 handle
45 power cord
50 power switch
55 thermostatic control
60 power indication light
65 heating coil
70 heating indication light
75 support feet
80 baking pan
85 radiant heat
90 dough
95 fill port
100 tethered watertight snap cap
105 first heat transferring barrier
110 coil support system
115 second heat transferring barrier
120 drawer slides
125 power plug
130 ground connection
135 hot leg
140 neutral leg
145 over temperature limit switch

DESCRIPTION OF THE PREFERRED EMBODIMENTS

The best mode for carrying out the invention is presented in terms of its preferred embodiment, herein depicted within FIGS. 1 through 6. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Figure 1:
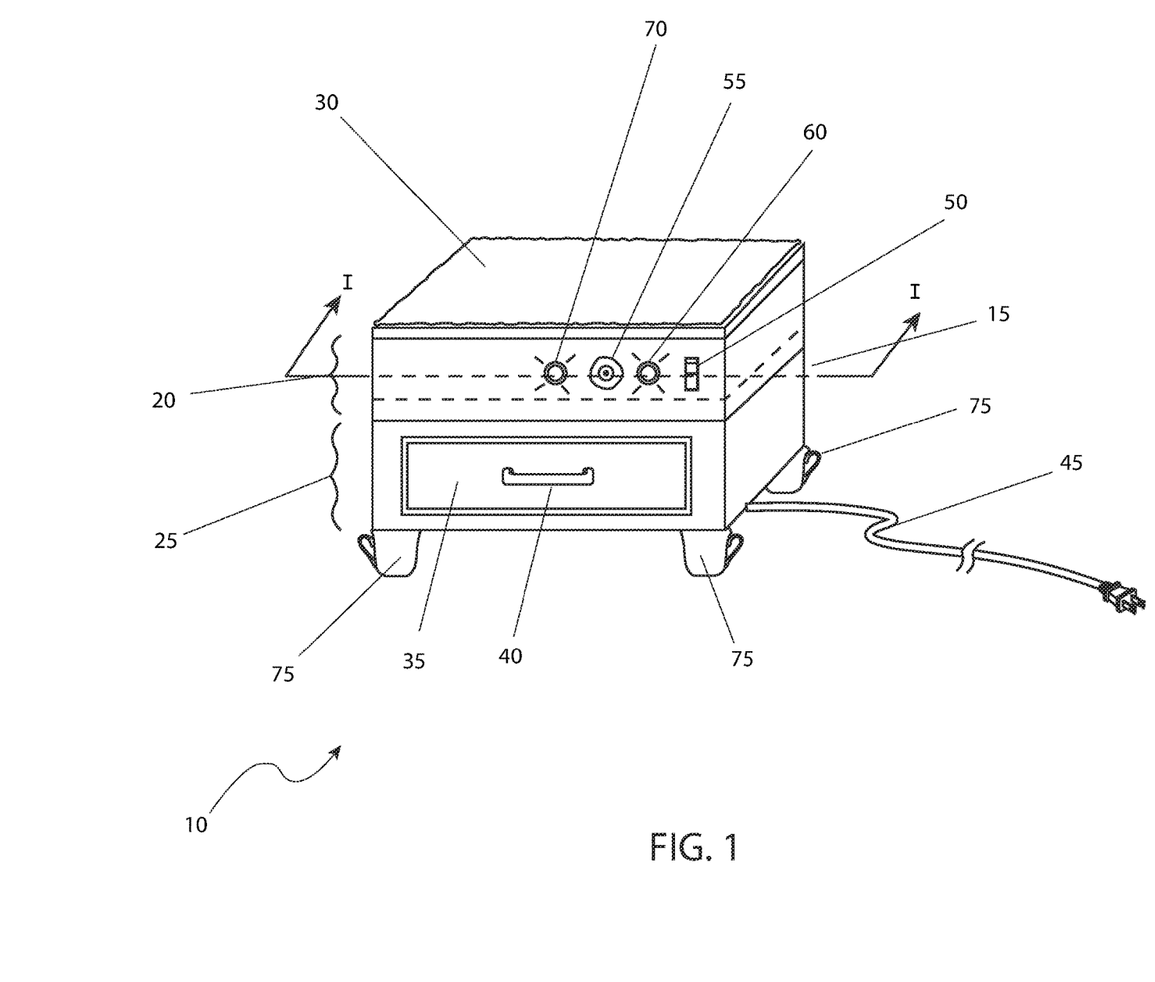
FIG. 1 is an isometric view of the dough rising appliance 10, according to the preferred embodiment of the present invention.

Referring now to FIG. 1, an isometric view of the dough rising appliance 10, according to the preferred embodiment of the present invention is disclosed. The dough rising appliance 10 (herein also described as the "device") 10, includes an outer enclosure 15 envisioned to be made of sheet steel. The appliance 10 is envisioned as a small countertop appliance with the approximate dimensions of fifteen inches (15 in.) deep and fifteen inches (15 in.) wide and provides for an upper tray 20 and an optional lower drawer section 25. It is noted that the specific size of the device 10 may vary per specific model and is thus not a limiting factor of the present invention.

The upper tray 20 holds a removable bladder 30 which will be described in greater detail herein below. The removable bladder 30 sits in the upper tray 20 and is removable for cleaning or replacement should it be necessary. The removably bladder 30 ideally retains a quantity of water therein but any suitable heat retaining liquid may be utilized. The optional lower drawer section 25 contains a slide-out drawer 35, complete with a handle 40. The slide-out drawer 35, is optional and does not impact on the primary function of the device 10, which is to facilitate the raising of baking dough. Should the optional lower drawer section 25, the slide-out drawer 35, and associated components be provided, it may serve many uses, including but not limited to: general storage, warming towels, keeping food warm prior to serving, rewarming foods such as cookies and cakes to enhance apparent freshness, or the like.

The device 10 is powered by AC current through a power cord 45 which connects to a conventional household power outlet (not shown). The device 10 is activated via a power switch 50 and controlled by a thermostatic control 55. Application of AC power to the device 10 is indicated by a power indication light 60, and application of AC power to the heating coil 65 (not shown in this figure due to illustrative limitations) is indicated by a heating indication light 70. Finally, the appliance 10 is supported by four (4), of which only three (3) are shown due to illustrative limitations. The support feet 75 may be decorative in nature, here depicted in the image of miniature teacups, for enhancing the overall aesthetic appeal of the device 10. It is noted however, that the decorative nature of the support feet 75 is not intended to be a limiting factor of the present invention.

Figure 3:
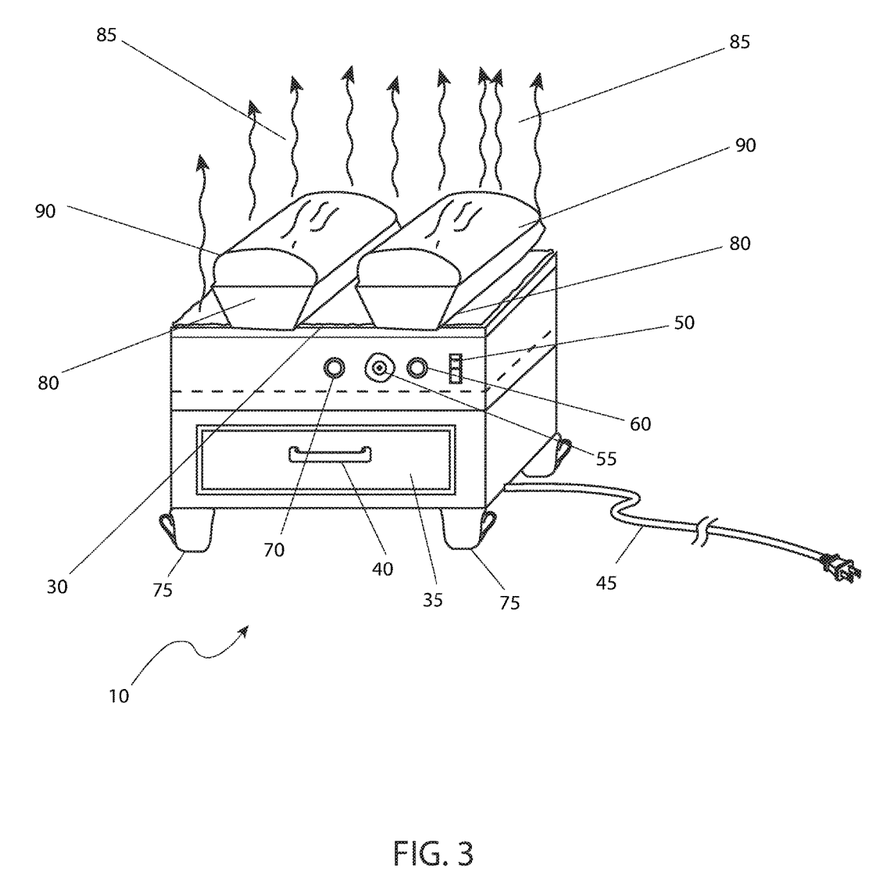
FIG. 3 is an isometric view of the dough rising appliance 10, shown in a utilized state, according to the preferred embodiment of the present invention.

Referring next to FIG. 3, an isometric view of the device 10, shown in a utilized state, according to the preferred embodiment of the present invention is depicted. At least one (1), and herein depicted at two (2), baking pans 80 are placed atop the removable bladder 30 during use. Heat from the heating coil 65 (not visible due to illustrative limitations) pass through and are evened and tempered by the removable bladder 30 and is emitted upward as radiant heat 85. As said, radiant heat 85 passes through the baking pans 80 to cause the dough 90 to rise. The even, constant, and moist radiant heat 85 results in the ideal environment for the dough 90 to rise and ultimately results in perfect baked goods upon baking and final preparation. It is noted that the quantity of baking pans 80 capable of being utilized upon the appliance 10 is related to the overall size and quantity of the baking pans 80 and is thus not limited nor dependent upon the total area of the removable bladder 30 which may vary depending upon model variation as aforementioned described.

Figure 4:
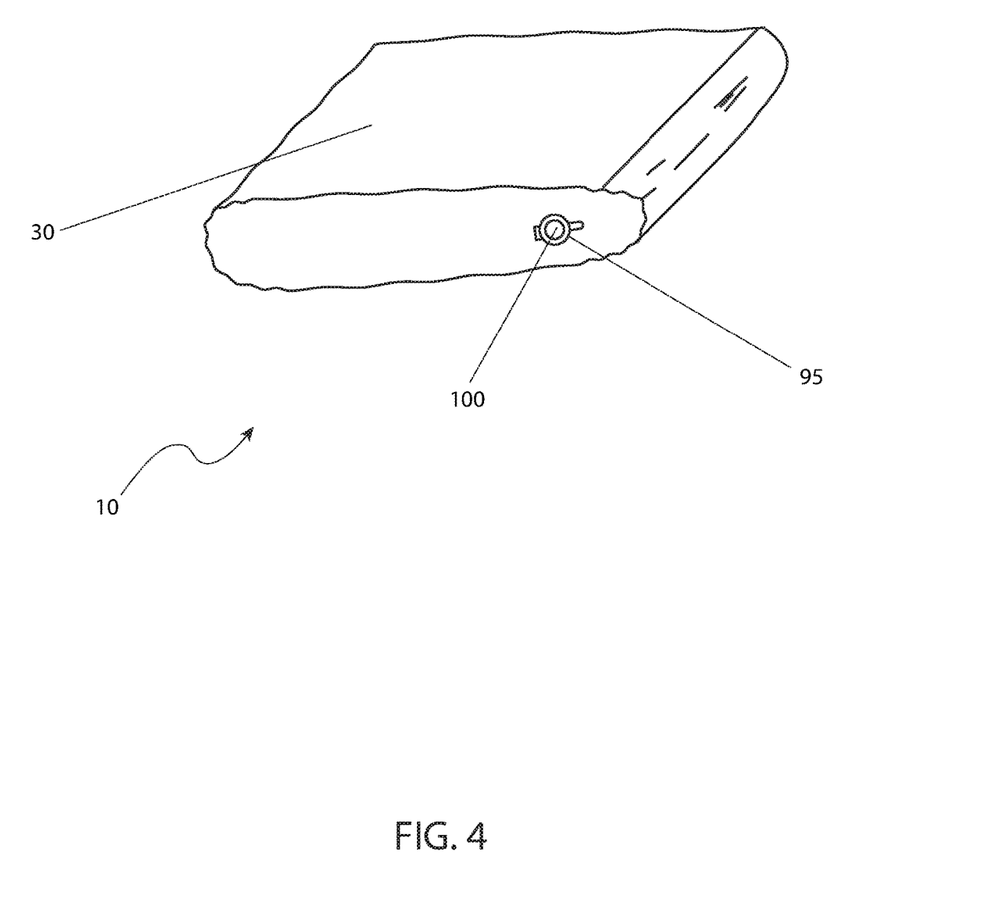
FIG. 4 is an isometric view of the removable bladder 30, as used with the dough rising appliance 10, according to the preferred embodiment of the present invention.

Referring now to FIG. 4, an isometric view of the removable bladder 30, as used with the device 10, according to the preferred embodiment of the present invention is shown. The removable bladder 30 is generally rectangular in shape and is provided with softened edges to facilitate internal strength and reduce potential damage. The removable bladder 30 is filled with water through a fill port 95 complete with a tethered watertight snap cap 100. The internal water could be removed to reduce weight and overall storage requirements of the device 10 in between uses. It could also be left in should the device 10 be used frequently, however, frequent exchanges of water would be viewed as beneficial to reduce mold and contamination. The removable bladder 30 is removable, washable, and can be replaced if needed due to becoming stained, leaks, or other impairments that prevent proper operation.

Figure 5A:
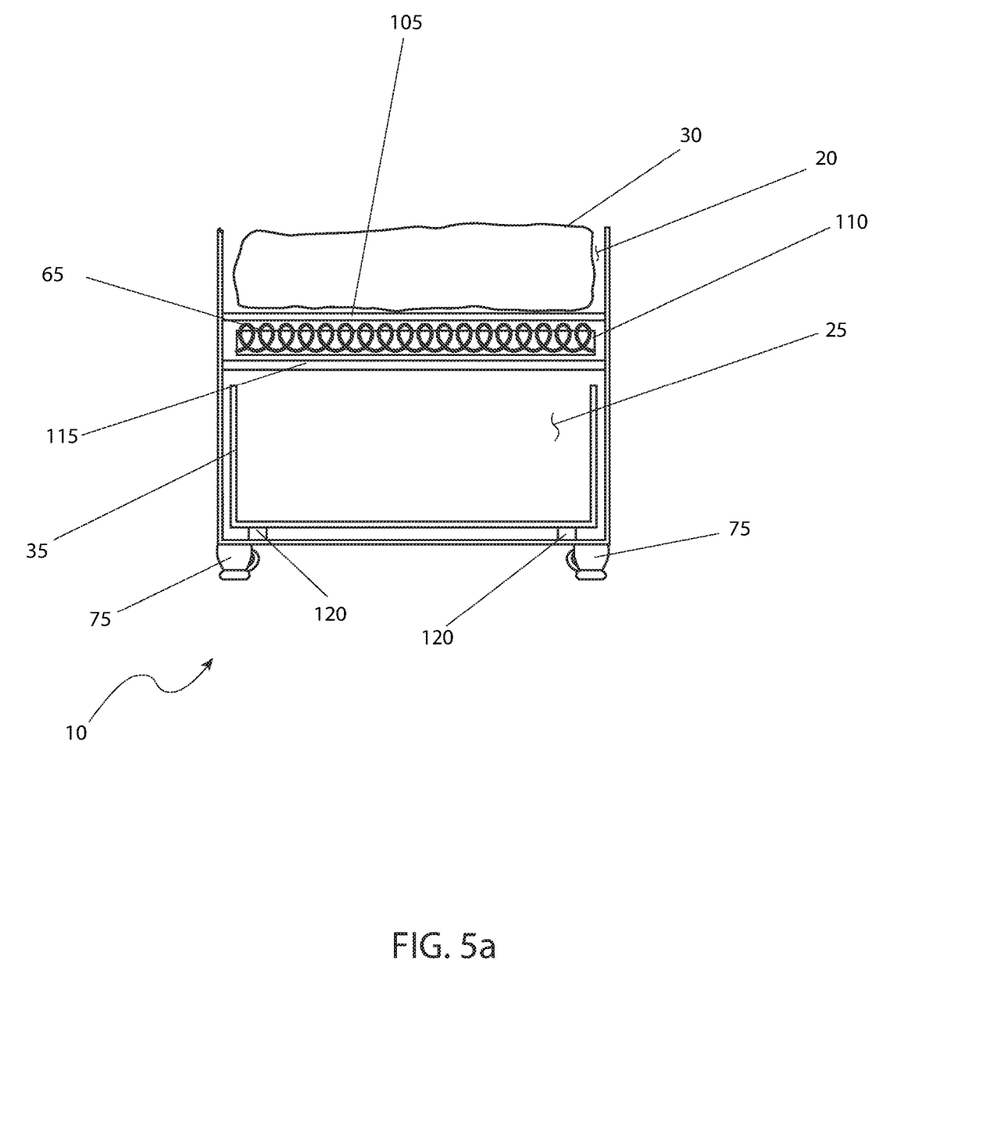
FIG. 5a is a sectional view of the dough rising appliance 10, as seen along a line I-I, as shown in FIG. 1, according to the preferred embodiment of the present invention.

Referring next to FIG. 5a, a sectional view of the device 10, as seen along a line I-I, as shown in FIG. 1, according to the preferred embodiment of the present invention is disclosed. The removable bladder 30 is located in the upper tray 20 and is bounded on the bottom by a first heat transferring barrier 105. The first heat transferring barrier 105 permits heat emanating from the heating coil 65 to be transferred upward into the removable bladder 30. The heating coil 65 is radially wound around a coil support system 110 that is both electrically insulated and thermally resistant to high temperatures such as mica. A smaller portion of the heat from the heating coil 65 is also directed downward through a second heat transferring barrier 115 and into the slide-out drawer 35, if so provided as part of the optional lower drawer section 25. The slide-out drawer 35 is supported by two (2) drawer slides 120 that are attached to the bottom of the outer enclosure 15. The rear two (2) support feet 75 are visible on the bottom of the outer enclosure 15 where they serve as support structures.

Figure 2:
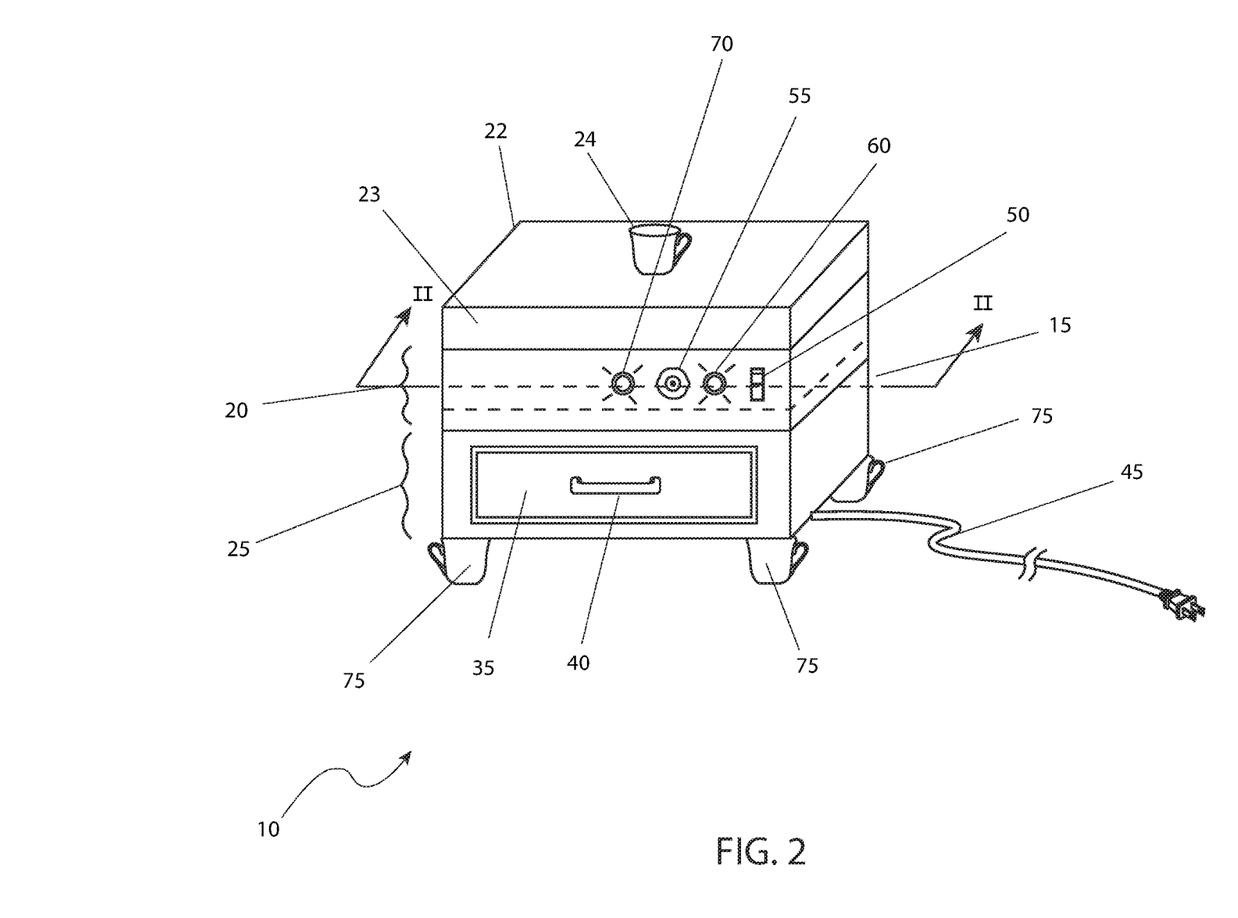
FIG. 2 is an isometric view of the dough rising appliance 10 with a lid, according to the preferred embodiment of the present invention.
Figure 5B:
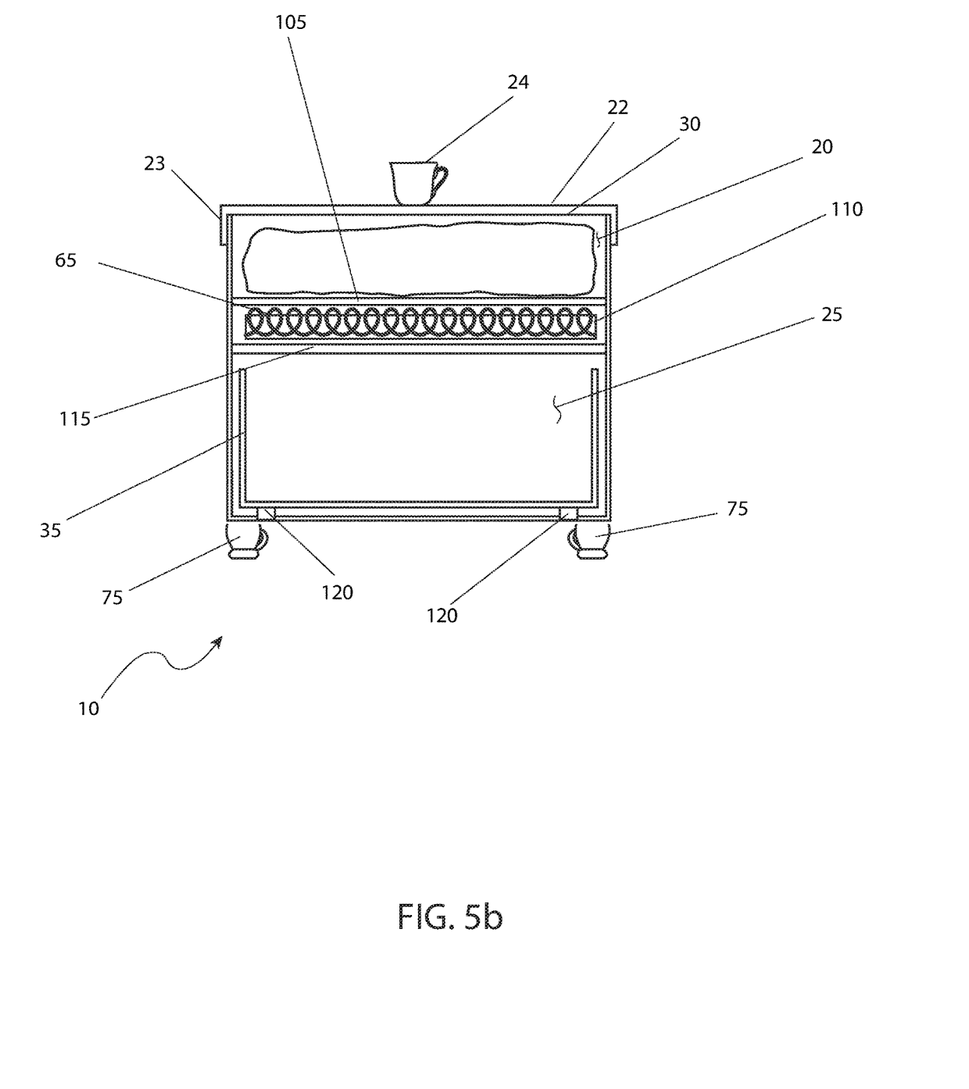
FIG. 5b is a sectional view of the dough rising appliance 10, as seen along a line II-II, as shown in FIG. 2, according to the preferred embodiment of the present invention; and, FIG. 6 is an electrical block diagram of the dough rising appliance 10, according to the preferred embodiment of the present invention.

Referring now to FIGS. 2 and 5b, there can be seen a lid 22 in use with the device 10. The lid is preferably a planar body with a lid skirt 23 depending downward from the perimeter thereof to a length approximately two inches (2 in.). The lid 22 has an area sized to fully cover the water bladder 30 of the upper tray 20 when placed thereon, and the lid skirt 23 stops short of covering the power switch 50, the thermostatic control 55, the power indication light 60, and the heat indication light 70. Centrally located on an upper surface of the lid 22 is a lid handle 24, which in a preferred embodiment has a decorative element matching that of the support feet 75.

Figure 6:
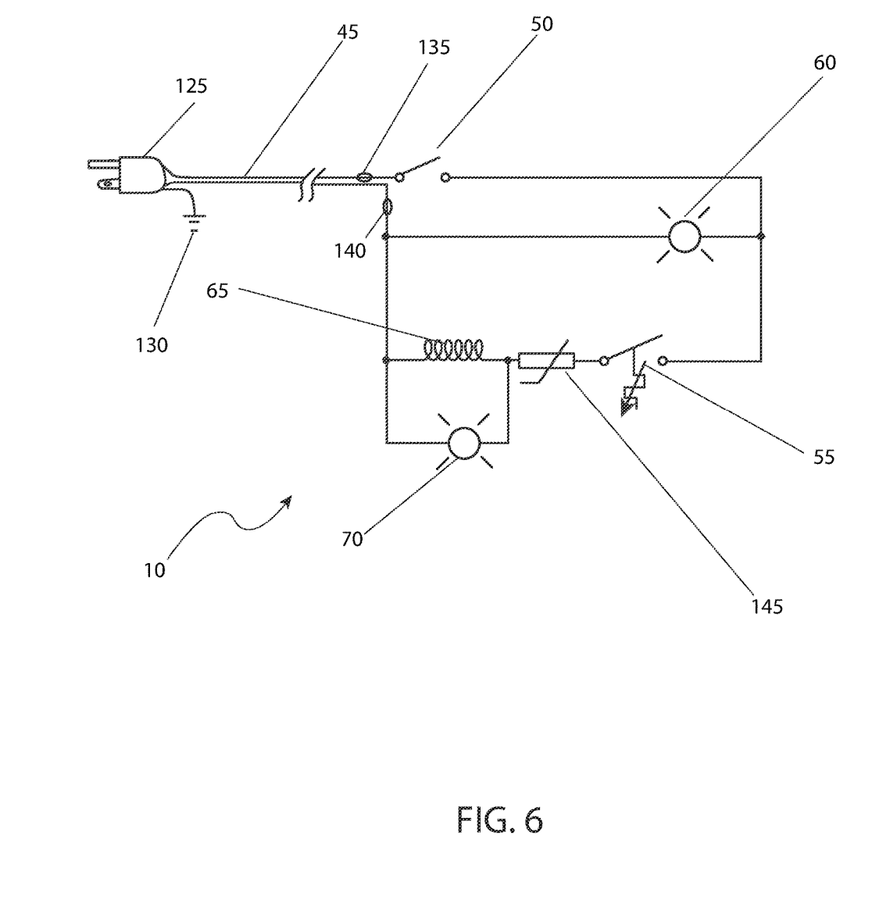

Referring finally to FIG. 6, an electrical block diagram of the device 10, according to the preferred embodiment of the present invention is depicted. AC power is provided via a power plug 125 located at the end of the power cord 45. A ground connection 130 to the outer enclosure 15 (as shown in FIG. 1) would be provided for safety. It is envisioned, although not required, that the device 10 would be connected to a GFCI (ground fault current interrupting) receptacle as typically provided in a kitchen environment for additional safety given the presence of water used with the device 10. A hot leg 135 is routed through a power switch 50 and energizes the power indication light 60 through a return electrical path via a neutral leg 140. Concurrently, the switched power from the power switch 50 is routed through the thermostatic control 55 which allows for temperature adjustment by the user. An over temperature limit switch 145 is provided in series to automatically shutoff power the heating coil 65 should an over-temperature situation develop. The heating coil 65 and the heating indication light 70 operate in a parallel simultaneous manner to inform the user via the heating indication light 70 whenever the heating coil 65 is active. The opposite pole of the heating coil 65 and the heating indication light 70 are connected to the neutral leg 140 thus completing the circuit.

2. Operation of the Preferred Embodiment

The preferred embodiment of the present invention can be utilized by the common user in a simple and effortless manner with little or no training. It is envisioned that the device 10 would be constructed in general accordance with FIG. 1 through FIG. 6. The user would procure the device 10 through normal procurement channels used to obtain other countertop appliances such as mixers, toaster ovens, toasters, and the like. Particular attention would be paid to overall size depending on anticipated use of the device 10.

After procurement and prior to utilization, the device 10 would be prepared in the following manner: the device 10 would be placed in the desired location; the power plug 125 would be connected to a suitable power source, the removable bladder 30 would be filled with water through the fill port 95; the removable bladder 30 would then be placed in the upper tray 20; the power switch 50 would be switched on; a desired temperature set point would be set via the thermostatic control 55, and proper operation would be verified via illumination of the power indication light 60 and the heat indication light 70.

During utilization of the device 10, the following procedure would be initiated: the baking pans 80 filled with dough 90 would be placed atop the removable bladder 30; after a suitable period of time in which the dough 90 will rise, the baking pans 80 are removed from the device 10 and processed further using normal baking processes. The removable bladder 30 along with the slide-out drawer 35, if provided, can also be used to warm, rewarm and keep other foodstuffs warm. The heating abilities of the device 10 can be used to thaw frozen dough and other frozen foods without danger of cooking or burning.

After use of the device 10, it is simply deactivated by the power switch 50, and the removable bladder 30 wiped clean and perhaps emptied of water, depending on envisioned future usage. Such usage then continues in a cyclical fashion as described above. If so desired, the lid 22 can be placed on the upper tray 20 to protect the water bladder from the environment.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A dough rising appliance, comprising:
   an outer enclosure;
   an upper tray holding a removable bladder, said removable bladder sits in said upper tray and is removable, said removable bladder is filled with a liquid through a fill port complete with a tethered watertight snap cap;
      wherein, said removable bladder is bounded on a bottom by a first heat transferring barrier; and,
      wherein, said heat transferring barrier permits heat emanating from a heating coil to be transferred upward into said removable bladder;
   a lower drawer section containing a slide-out drawer;
      wherein said slide-out drawer having a handle and said slide-out drawer is supported by a pair of drawer slides that are attached to said bottom of said outer enclosure;
   a power switch controlled by a thermostatic control activating said dough rising appliance;
   a power indication light indicating application of AC power to a heating coil indicated by a heating indication light;
   an over temperature limit switch is provided in series to automatically shutoff power said heating coil should an over-temperature situation develop; and,
   a plurality of support feet supporting said dough rising appliance;

wherein said heating coil and said heating indication light operate in a parallel simultaneous manner to inform said user via said heating indication light whenever said heating coil is active.

2. The dough rising appliance according to claim 1, further comprising at least one baking pan placed atop said removable bladder during use;

wherein heat from said heating coil are evened and tempered by said removable bladder and is emitted upward as radiant heat; and, wherein said radiant heat passes through said at least one baking pan to cause a plurality of dough to rise with even, constant, and moist radiant heat results in an environment for said dough to rise.

3. The dough rising appliance according to claim 1, further comprising a ground connection to said outer enclosure provided for safety.

4. The dough rising appliance according to claim 1, further comprising a ground fault current interrupting receptacle connected to said dough rising appliance is provided for safety.

5. The dough rising appliance according to claim 1, wherein said removable bladder is generally rectangular in shape and is provided with a plurality of softened edges to facilitate internal strength and reduce potential.

6. The dough rising appliance according to claim 1, wherein said liquid of said removable bladder is removed to reduce weight and overall storage requirements in between uses of said dough rising appliance.

7. The dough rising appliance according to claim 6, wherein said heating coil is radially wound around a coil support system that is both electrically insulated and thermally resistant to high temperatures.

8. The dough rising appliance according to claim 7, wherein said heating coil is made of mica.

9. The dough rising appliance according to claim 1, further comprising a lid with a planar body with a lid skirt.

10. The dough rising appliance according to claim 9, wherein said lid has an area sized to fully cover said water bladder of said upper tray when placed thereon and said lid skirt stops short of covering said power switch, said thermostatic control, said power indication light, and said heat indication light.

11. The dough rising appliance according to claim 10, wherein centrally located on an upper surface of said lid is a lid handle.

12. The dough rising appliance according to claim 1, wherein said lower drawer section is used for general storage, warming towels, keeping food warm prior to serving, and rewarming foods to enhance apparent freshness.

13. The dough rising appliance according to claim 1, wherein said heating coil and said heating indication light operate in a parallel simultaneous manner to inform said user via said heating indication light whenever said heating coil is active.

14. The dough rising appliance according to claim 1, further comprising an opposite pole of said heating coil and said heating indication light are connected to said neutral leg thus completing a circuit.

15. The dough rising appliance according to claim 1, further comprising a portion of heat from said heating coil is also directed downward through a second heat transferring barrier and into said slide-out drawer, when provided as part of said lower drawer section.

16. The dough rising appliance according to claim 15, wherein said heating coil is made of mica.

17. The dough rising appliance according to claim 1, wherein said removable bladder is removable, washable, and replaceable.

18. The dough rising appliance according to claim 1, further comprising a hot leg is routed through a power switch and energizes said power indication light through a return electrical path via a neutral leg.

19. The dough rising appliance according to claim 18, wherein concurrently said switched power from said power switch is routed through said thermostatic control which allows for temperature adjustment by said user.

20. The dough rising appliance according to claim 1, wherein said dough rising appliance is powered by AC current through a power cord.

* * * * *